(12) United States Patent
Sasaki et al.

(10) Patent No.: US 11,760,240 B2
(45) Date of Patent: Sep. 19, 2023

(54) SURFACE SKIN, MOLDED PRODUCT, AND VEHICLE SEAT

(71) Applicants: TACHI-S CO., LTD., Akishima (JP); AZUMA CO., LTD., Tokyo (JP)

(72) Inventors: Seiichi Sasaki, Akishima (JP); Toshiyuki Takeda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 17/556,829

(22) Filed: Dec. 20, 2021

(65) Prior Publication Data

US 2022/0250517 A1 Aug. 11, 2022

(30) Foreign Application Priority Data

Feb. 8, 2021 (JP) .................. 2021-017975

(51) Int. Cl.
*B60N 2/58* (2006.01)
*D02G 3/44* (2006.01)
*B60N 2/70* (2006.01)
*D05B 93/00* (2006.01)

(52) U.S. Cl.
CPC ......... *B60N 2/5883* (2013.01); *B60N 2/7017* (2013.01); *D02G 3/446* (2013.01); *D05B 93/00* (2013.01); *D10B 2331/02* (2013.01); *D10B 2331/04* (2013.01); *D10B 2505/12* (2013.01)

(58) Field of Classification Search
CPC .... Y10S 297/01; Y10S 297/02; Y10S 264/14; A47C 7/18; B60N 2/58; B60N 2/5825; B60N 2/5891; B60N 2/70; B60N 2/7017
See application file for complete search history.

(56) References Cited

U.S. PATENT DOCUMENTS

| | | | | |
|---|---|---|---|---|
| 3,468,275 A * | 9/1969 | Fake | ................ | D05B 15/025 36/11 |
| 6,561,581 B2 * | 5/2003 | Michot | ................ | B60N 2/5833 297/452.6 |
| 8,516,697 B2 * | 8/2013 | Akaike | ................ | B60N 2/5685 29/874 |
| 8,524,622 B2 * | 9/2013 | Akaike | ................ | B60N 2/5685 442/232 |

(Continued)

FOREIGN PATENT DOCUMENTS

JP 2020-065841 A 4/2020
WO WO 2006/001067 1/2006

OTHER PUBLICATIONS

Extended European Search Report dated Jul. 19, 2022, for European Patent Application No. 22154753.2.

*Primary Examiner* — Shin H Kim
(74) *Attorney, Agent, or Firm* — Potomac Law Group, PLLC

(57) ABSTRACT

A surface skin with which a foamed body is integrally foam-molded and which covers the foamed body includes: a plurality of surface skin members; a first thread passing through at least a part of a needle hole extended through the surface skin members so as to sew the surface skin members together; and a second thread inter-looping or interlacing with the first thread so as to sew the surface skin members together in cooperation with the first thread. The first thread is threaded through an eye of a needle. The second thread is formed by warp weaving or braiding polyester or nylon fiber pieces and is stretchable enough to fill in the needle hole.

7 Claims, 4 Drawing Sheets

(56) References Cited

U.S. PATENT DOCUMENTS

| | | | | |
|---|---|---|---|---|
| 8,919,270 B2* | 12/2014 | Wenzel | .................... | D05B 1/06 112/470.27 |
| 9,340,912 B2* | 5/2016 | Wenzel | ................ | B60N 2/5891 |
| 9,512,547 B2* | 12/2016 | Wenzel | .................. | B60K 37/04 |
| 9,566,763 B2* | 2/2017 | Wenzel | .................... | B32B 5/20 |
| 9,790,627 B2* | 10/2017 | Wenzel | .................... | D05C 7/04 |
| 9,869,044 B2* | 1/2018 | Wenzel | .............. | B60R 13/0256 |
| 10,315,383 B2* | 6/2019 | Wenzel | .................... | B32B 5/22 |
| 10,364,520 B2* | 7/2019 | Wenzel | .................. | B60R 13/02 |
| 11,052,924 B2* | 7/2021 | Van Abbema | ........ | B60W 50/16 |
| 2002/0043833 A1* | 4/2002 | Michot | ................ | B60N 2/5833 297/218.2 |
| 2004/0069762 A1* | 4/2004 | Yoneyama | ............... | H05B 3/34 219/217 |
| 2010/0258334 A1* | 10/2010 | Akaike | .................. | H05K 1/038 174/126.1 |
| 2012/0285008 A1* | 11/2012 | Akaike | .................. | H05B 3/347 29/825 |
| 2013/0008362 A1* | 1/2013 | Wenzel | .................. | D05B 57/32 112/53 |
| 2015/0042117 A1* | 2/2015 | Wenzel | .................. | D05B 93/00 112/475.08 |
| 2015/0176165 A1* | 6/2015 | Wenzel | .................. | B60R 13/02 112/475.17 |
| 2016/0052465 A1* | 2/2016 | Wenzel | .................. | B32B 27/30 112/475.18 |
| 2016/0122928 A1* | 5/2016 | Wenzel | .................... | D05B 1/06 296/70 |
| 2016/0369440 A1* | 12/2016 | Wenzel | .................. | D05B 15/00 |
| 2017/0233915 A1* | 8/2017 | Wenzel | .............. | B60R 13/0256 112/470.27 |
| 2017/0246837 A1* | 8/2017 | Wenzel | .................. | B32B 27/065 |
| 2019/0111946 A1* | 4/2019 | Van Abbema | ........... | B60N 2/70 |
| 2020/0333052 A1* | 10/2020 | Gruenwald | .......... | B60N 2/5692 |
| 2022/0250517 A1* | 8/2022 | Sasaki | .................. | B60N 2/5883 |

* cited by examiner

SURFACE SKIN, MOLDED PRODUCT, AND VEHICLE SEAT

CLAIM OF PRIORITY

The present application claims priority from Japanese patent application JP2021-17975 filed on Feb. 8, 2021, the content of which is hereby incorporated by reference into this application.

BACKGROUND

The disclosure of the present invention relates to a surface skin. For example, the present invention is applicable to a vehicle seat including a skin integrated foam-molded product.

There are known some head rests, arm rests and the like integrated with the vehicle seat (skin integrated foam-molded products) which are produced by the steps of: cutting a plurality of surface skin members into predetermined shapes; sewing the cut surface skin members into a bag shape by means of a sewing machine; and injecting a foaming liquid as a pad molding raw material into the skin bag for integrally foam molding the pad with the surface skin (Japanese Unexamined Patent Application Publication No. 2020-65841).

SUMMARY

The skin integrated foam molding technique may sometimes encounter the following problem. Some of the foaming liquid injected inside the skin bag may leak through a gap between a needle hole made by a needle sewing the surface skin members together and a thread and become hardened on the outside of the surface skin.

An object of the disclosure of the present invention is to provide a technique for preventing the leakage of the foaming liquid through the needle holes.

Typical aspects of the present invention can be summarized as follows.

That is, the surface skin covering a foamed body made by foam molding the foaming material includes: a plurality of surface skin members; a first thread passing through at least a part of a needle hole extended through the surface skin members so as to sew the surface skin members together; and a second thread sewing the surface skin members together by interlacing with the first thread. The first thread is threaded through an eye of a needle. The second thread is a thread formed by warp weaving or braiding a polyester or nylon fiber and having stretchability to fill in the needle hole.

According to the present invention, the leakage of the foaming liquid through the needle holes can be prevented.

DESCRIPTION OF THE PREFERRED EMBODIMENTS

Figure 1:
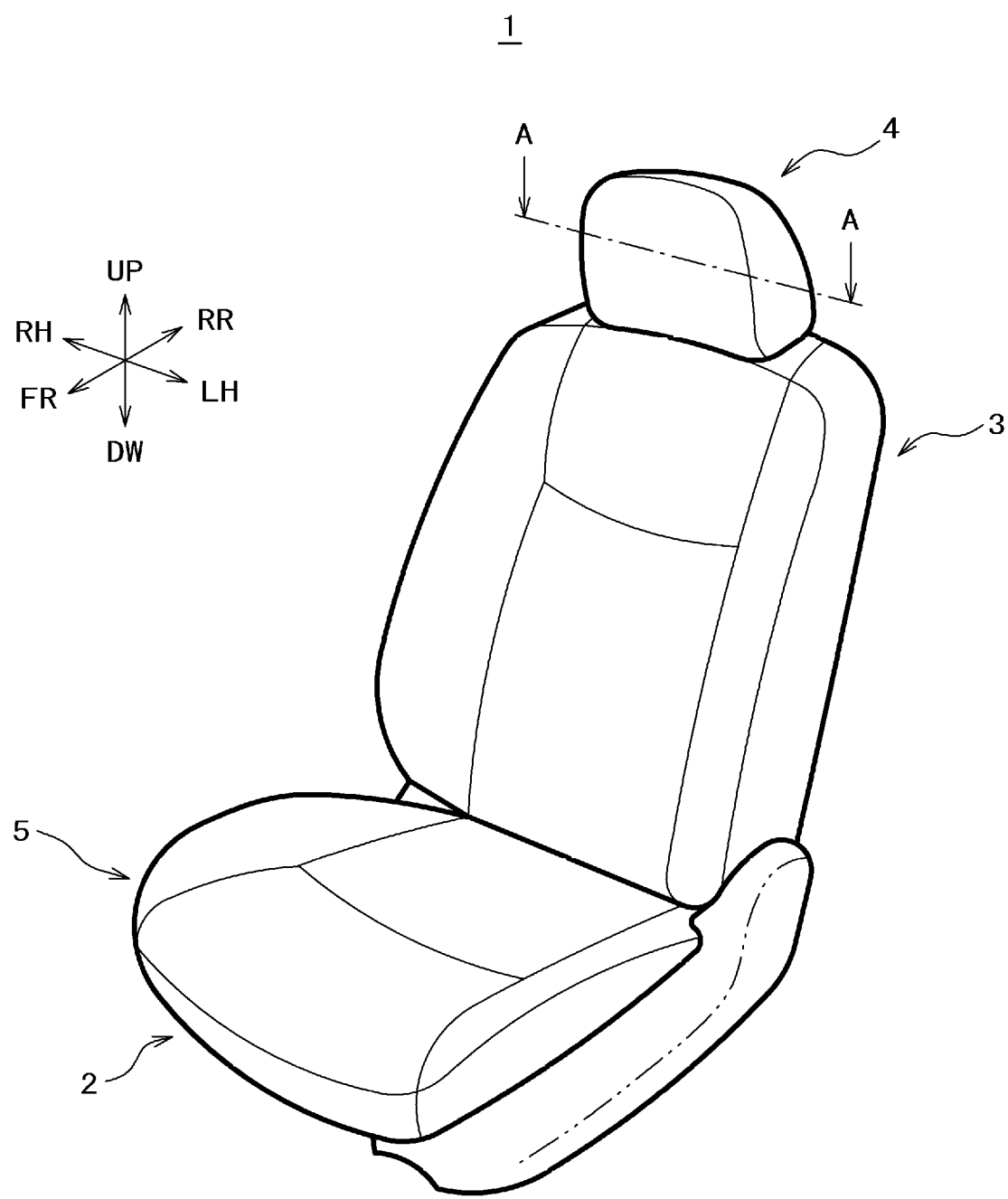
FIG. 1 is an outline view showing a seat for vehicle according to an embodiment hereof.

The embodiments of the present invention will hereinbelow be described with reference to the accompanying drawings. In the following description, however, the same or similar reference numerals are used to refer to the same or similar components which are explained only once in some cases to avoid repetitions. For greater clarity, there are cases where the drawings provide more schematic illustrations of some parts than those in practical modes in terms of width, thickness, shape and the like thereof. It is noted that the disclosure is meant only for an example. The drawings are not meant to limit the interpretation of the present invention.

A vehicle seat according to an embodiment of the present invention is described with reference to FIG. 1. FIG. 1 is an outline view showing a vehicle seat according to the embodiment.

In the following description, a vertical direction is defined as upward/downward directions (UP, DW) on the assumption that a vehicle equipped with the vehicle seat is placed on a horizontal plane. Further, forward/backward directions (FR, RR) are so defined as to coincide with the longitudinal direction of the vehicle while right/left directions are so defined as to coincide with a width direction of the vehicle. "FR" means a forward direction of the vehicle while "RR" means a backward direction of the vehicle. In the description of a vehicle seat 1, a right-hand side (RH) and a left-hand side (LH) are defined to mean the right side and the left side of the vehicle as seen from the rear side thereof.

The vehicle seat 1 includes a seat cushion 2, a seat back 3, a head rest 4, and side supports 5.

Figure 2:
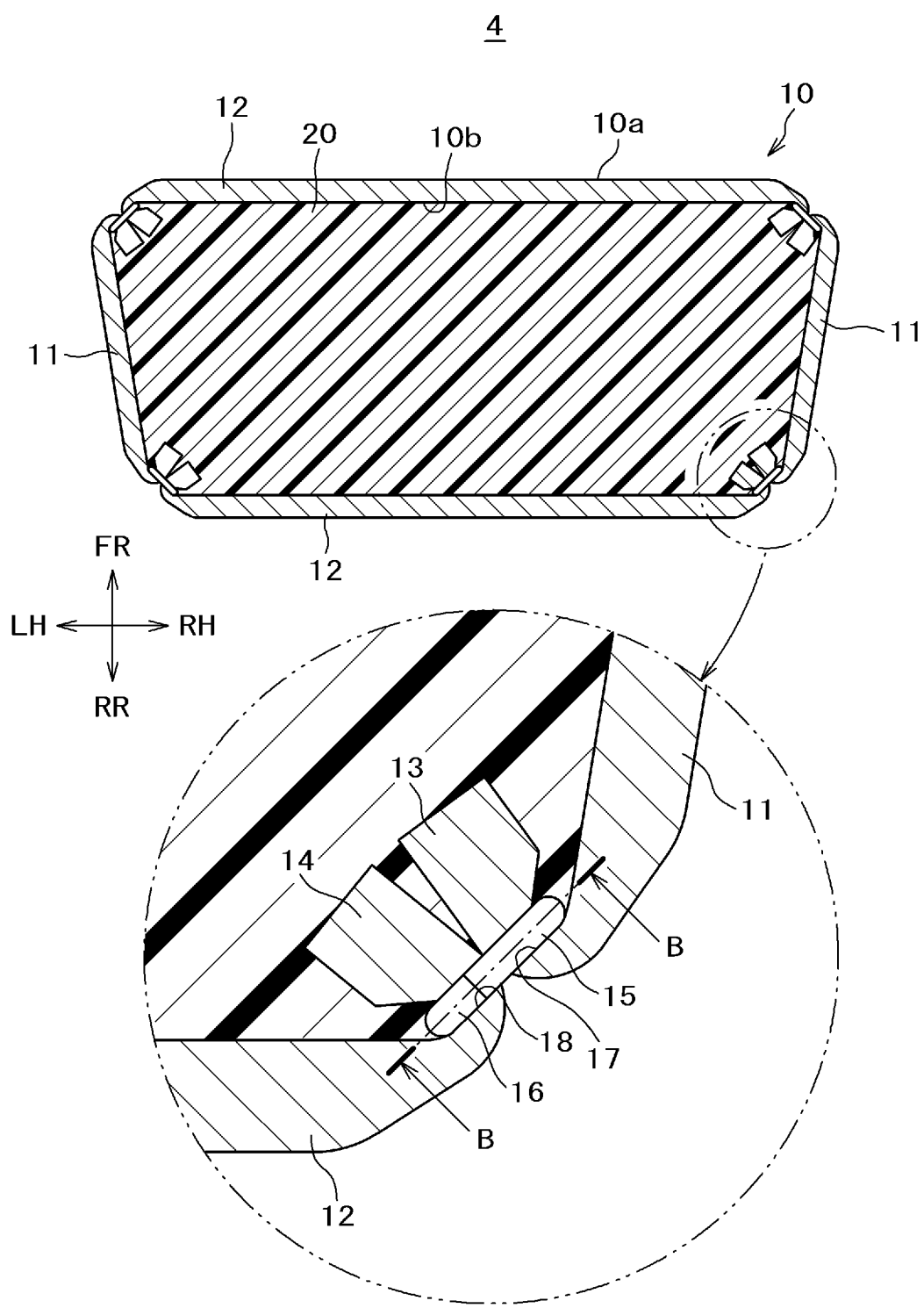
FIG. 2 is a sectional view of a head rest of FIG. 1 taken on the line A-A in FIG. 1.
Figure 3:
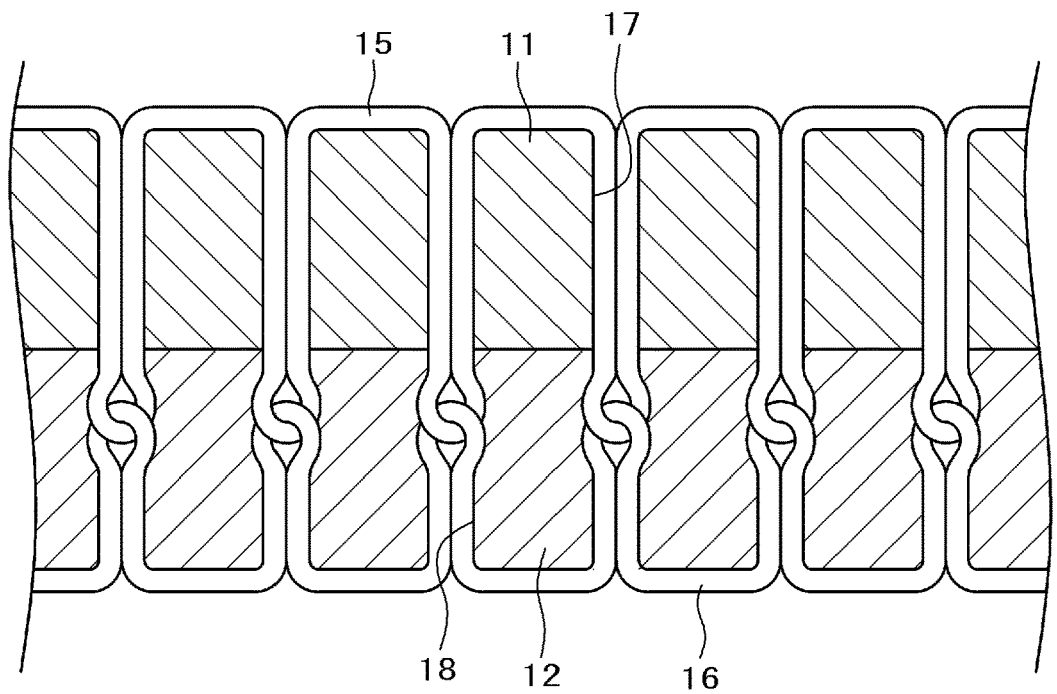
FIG. 3 is a sectional view of a surface skin of FIG. 2 taken on the line B-B in FIG. 2.

The description is made on the head rest 4 with reference to FIG. 2 and FIG. 3. FIG. 2 is a sectional view of the head rest of FIG. 1 taken on the line A-A in FIG. 1. FIG. 3 is a sectional view of a surface skin of FIG. 2 taken on the line B-B in FIG. 2

As shown in FIG. 2, the head rest 4 includes a foamed body 20 formed of a foamed synthetic resin such as soft polyurethane foam, and a surface skin 10 covering the foamed body 20. The head rest 4 is a skin integrated foam-molded product where the foamed body 20 made by foaming and hardening a foaming liquid is integrated with the surface skin 10. The foamed body is integrated with the surface skin 10 by integrally foaming the foaming liquid by injecting the foaming liquid under a back side 10b (inner side) of the surface skin 10 set in a cavity of a foaming mold (not shown).

As shown in FIG. 2 and FIG. 3, the surface skin 10 is a member for covering the foamed body 20. A surface 10a of the surface skin 10 defines an exterior surface of the head rest 4. The surface skin 10 includes a plurality of surface skin members 11, 12, and a first thread 15 and a second thread 16 for sewing together hem parts 13, 14 of the surface skin members 11, 12. While the surface skin 10 of this embodiment is substantially formed in a bag shape and covers the whole body of the foamed body 20, the surface skin 10 may also be formed in any other shape that covers a part of the foamed body 20.

From the viewpoint of comfortable seating, good tactile effect, stretchability, and the like, the surface skin members 11, 12 are constituted of two or more layers where a fabric-like foamed synthetic resin is integrally molded to a back side of fabric, synthetic leather, leather, or the like. However, it is also possible to omit the fabric-like foamed synthetic resin. In order to prevent the foaming liquid from immersing into the fabric or the fabric-like foamed synthetic resin, the surface skin members 11, 12 may also be arranged to attach a film to an inner side of the fabric or a fabric-like foamed synthetic resin, or to form a coating by thermally melting the inner side of the fabric-like foamed synthetic resin.

The surface skin 10 is formed by laying the hem parts 13, 14 of the two surface skin members 11, 12 on top of each other to bring the surfaces 10a thereof into contact, followed by sewing together the hem parts 13, 14 by means of the sewing machine stitching the whole length of the hem parts. Therefore, the first thread 15 and the second thread 16 are threaded through needle holes 17, 18 formed through the surface skin members 11, 12 by the sewing needle during the sewing operation, and lace each other to sew up the two surface skin members 11, 12. It is noted here that the first thread 15 is a needle thread threaded through an eye formed in a sewing needle not shown. The second thread 16 is a bobbin thread set in a bobbin. The term "interlace" means that one thread intersects with a loop of the other thread or passes through a loop of the other thread.

According to the embodiment, a thread lacing portion between the first thread 15 and the second thread 16 is located at place shifted into the surface skin member 12 (at a lower part of the drawing surface of FIG. 3) from a boundary between the two surface skin members 11, 12. Therefore, the first thread 15 is partially passed into the needle hole 18 in the surface skin member 12 (lower part of the drawing surface of FIG. 3) while passed through the needle hole 17 in the surface skin member 11. On the other hand, the second thread 16 is partially passed into the needle hole 18 in the surface skin member 12 but is not passed into the needle hole 17 in the surface skin member 11.

The first thread 15 is a normal machine-sewing thread made of a strong synthetic resin such as polyester spun yarn, nylon filament, polyester filament, or bond processed yarn. It is noted here that the polyester spun yarn is a synthetic fiber to which a texture of a natural material such as cotton is attached. The nylon filament and the polyester filament are synthetic fibers to which a texture of a natural material such as silk is attached. The bond processed fiber means a thread made by coating a nylon filament or polyester filament with a bond resin. The first thread 15, for example, is a count 8 thread. The sewing needle, for example, is a DP×17LE needle count 18 SPD.

The second thread 16 has a finely weaved structure and is composed of, for example, a polyester bulky yarn or nylon bulky yarn having stretchability. The second thread 16 has sufficient stretchability for filling in a hole made by the needle during the sewing operation and is formed by warp weaving or braiding (tightly braided or loosely braided). A piece of second thread 16 has a finely braided structure and hence, is physically flexible. This ensures that even if the foaming liquid should fail to uniformly permeate the thread, the thread still has flexibility by virtue of the weaved texture. Accordingly, the bulky fibers can fit in the needle hole, thus physically preventing the liquid leakage. That is, the thread can obviate the liquid leakage.

In a case where the second thread 16 is composed of a bulky spun yarn or textured yarn alone, as set forth in Japanese Unexamined Patent Application Publication No. 2020-65841, the expansion of the thread with the foaming liquid is increased by loosely twisting the yarns or not twisting the yarns. Loosely twisted, however, the thread lacks in flexibility so that the liquid leakage results if the foaming liquid fails to permeate the thread uniformly.

According to the embodiment, the thread having stretchability is used for filling in the hole made by the needle so as to prevent the liquid leakage. According to Japanese Unexamined Patent Application Publication No. 2020-65841, the untwisted thread per se is expanded with the liquid. On the other hand, the embodiment is adapted to make the thick thread by braiding fibers. The second thread 16 is made of one type of material and has an advantage of a piece of thread having a fine structure.

According to the embodiment, the second thread 16 is thinned under tension just before subjected to sewing but becomes as thick as after the thread is sewn. That is, the second thread 16 has the same thickness as a normal count 8 spun yarn at the sewing moment. After sewn on the surface skin members, however, the thread recovers its original thickness and fills in the needle hole, so as to prevent the liquid leakage during the foaming process.

The second thread 16 as the bobbin thread is a stretchable thread. It is also considered all right to use the stretchable thread as the first thread 15 which is the needle thread. However, the first thread 15 is too thick to be threaded through the eye of the sewing needle. Therefore, the embodiment applies the stretchable thread only to the bobbin thread. In a case where the stretchable thread is used as the first thread 15, the thread is thinned to 100 d or less and braided up. According to the embodiment, the description is made on a case where the stretchable thread is applied only to the bobbin thread.

When the surface skin members 11, 12 are sewn together with the first thread 15 and the second thread 16, a sealing material such as a woolly spin tape is overlapped on the surface skin members 11, 12 and sewn together. By doing so, the foaming liquid is more positively prevented from leaking through the needle holes 17, 18 during the foam molding of the foamed body 20. According to the embodiment, however, the sealing member is not sewn together with the surface skin members. Therefore, a step of sewing the sealing member to a correct position can be dispensed with, resulting in an enhanced sewing operation efficiency.

First Embodiment

Figure 4:
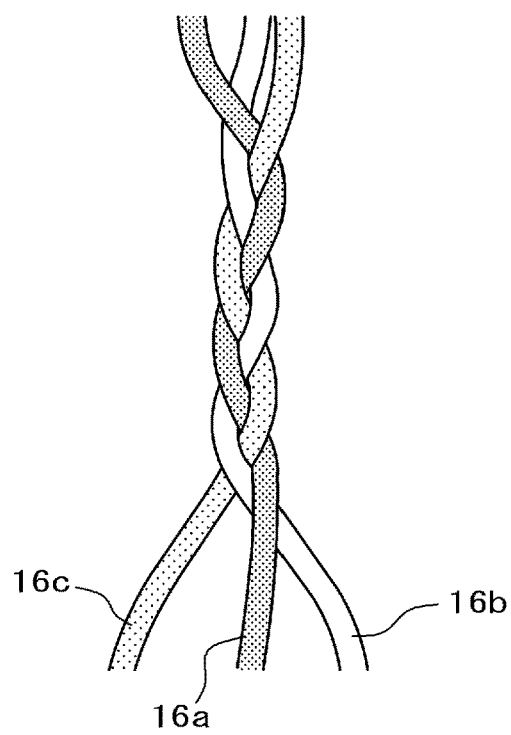
FIG. 4 is a schematic diagram showing a second thread according to a first embodiment hereof.

How to braid fibers of the second thread 16 according to a first embodiment hereof is described with reference to FIG. 4. FIG. 4 is a schematic diagram showing the second thread according to the first embodiment.

First, a thread having a thickness of 200 d is formed by twisting two pieces of fiber each having a fineness of 100 d. Subsequently, two pieces of the thread each having the fineness of 200 d are twisted to form a thread having a thickness of 400 d. Thus, pieces of thread 16a, 16b, 16c are formed as shown in FIG. 4. That is, the pieces of thread 16a, 16b, 16c each have a fineness of 400 d as formed of four pieces of fiber each having a fineness of 100 d (100 d×2×2=400 d (4 pieces)). It is noted here that "denier" [d] which is a unit of fineness indicating the thickness of thread represents a mass of 9,000 meter of thread in grams.

The three pieces of thread 16a, 16b, 16c each having a fineness of 400 d are braided together, as shown in FIG. 4. Thus, a single thread having a fineness of 1200 d (3×400 d (4 pieces)=1200 d (12 pieces)) is formed of three pieces of thread, each having the fineness of 400 d. This constitutes the second thread 16. The second thread 16 is not made by twisting three pieces of thread but by braiding three pieces of thread. Therefore, the three pieces of thread do not untwine spontaneously.

As for a braiding method, 1-inch-long thread can be made by braiding fiber pieces 10 times (gear 26 tight braiding type) or 1-inch-long thread can be made by braiding fiber pieces 7 times (gear 36 loose braiding type). The tight braiding type is not limited to repeating 10 braiding steps to make 1-inch-long thread but the braiding step can be repeated 9 times or repeated 11 times to make 1-inch-long thread. Further, the loose braiding type is not limited to repeating 7 braiding steps to make 1-inch-long thread but the braiding step can be repeated 8 times to make 1-inch-long thread or repeated 6 times to make 1-inch-long thread.

Second Embodiment

Figure 5:
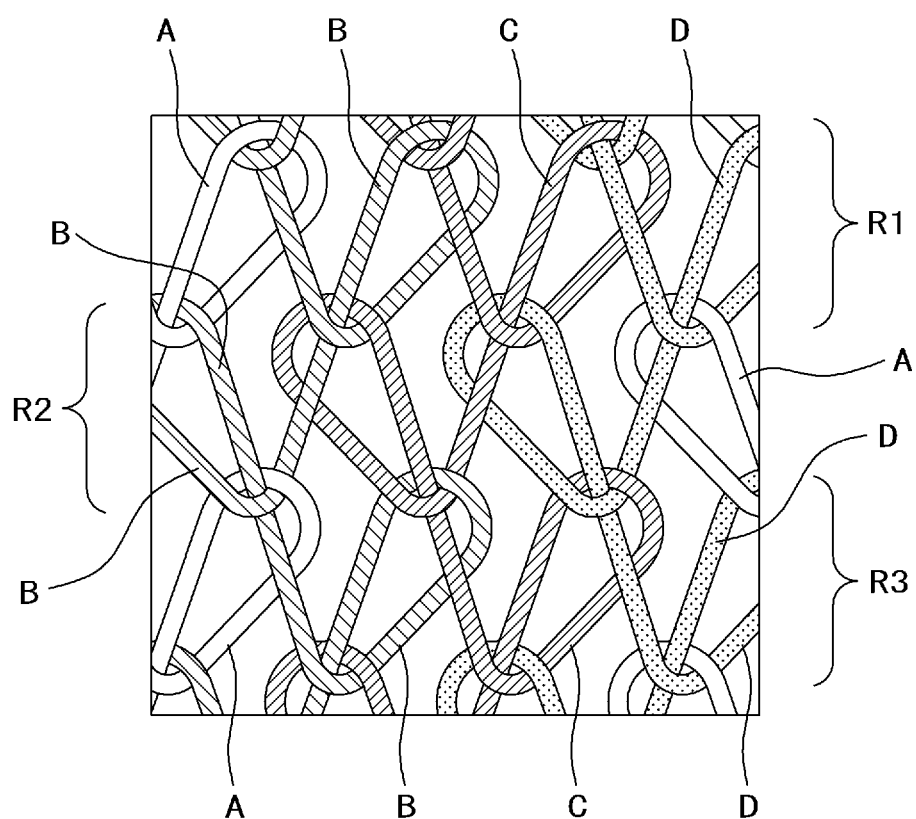
FIG. 5 is a schematic diagram showing a second thread according to a second embodiment hereof.

The description is made on a method of braiding the second thread 16 according to a second embodiment hereof. FIG. 5 is a schematic diagram of the second thread according to the second embodiment.

The braid is classified into weft braid and warp braid. According to the second embodiment, the second thread 16 is formed by warp braiding. First, two pieces of fiber each having a fineness of 100 d are twisted to form a thread having a thickness of 200 d. Thus, pieces of thread A, B, C, D shown in FIG. 5 are obtained. Namely, the pieces of thread A, B, C, D each have a fineness of 200 d and is formed of two pieces of fiber each having a fineness of 100 d (100 d×2=200 d (2 pieces)). As shown in FIG. 5, the second thread 16 is a four-thread warp braided cord formed of four pieces of thread A, B, D, D which are complicatedly braided and vertically extended while individually forming loops. In a row R1, for example, the thread A, the thread B, the thread C, and the thread D form respective loops in the order named from the left side of the drawing. In a row R2, the thread B, the thread C, the thread D, and the thread A form respective loops in the order named from the left side of the drawing. In a row R3, the thread A, the thread B, the thread C, and the thread D form respective loops in the order named from the left side of the drawing. The second thread 16 has a fineness of 800 d (100 d×2×4).

While the disclosure of the present invention made by the present inventors has been specifically described with reference to the embodiments and examples thereof, it goes without saying that the present invention is not limited to the foregoing embodiments and examples, and a variety of changes and modifications can be made thereto.

While the embodiments have been described by way of example of the head rest for vehicle seat, the embodiments are also applicable to other skin integrated foam-molded products such as arm rest, and console box.

What is claimed is:

1. A surface skin with which a foamed body is integrally foam-molded and which covers the foamed body, comprising:
a plurality of surface skin members;
a first thread passing through at least a part of a needle hole extended through the surface skin members so as to sew the surface skin members together; and
a second thread sewing the surface skin members together by interlacing with the first thread,
wherein the first thread is a thread threaded through an eye of a needle; and
the second thread is a thread formed by warp weaving or braiding a polyester or nylon fiber and having stretchability to fill in the needle hole.

2. The surface skin according to claim 1, wherein the second thread is a thread which is formed by twisting two pieces of fiber to form a twofold thicker thread, followed by twisting two pieces of the twofold thicker thread to form a four-fold thicker thread, followed by braiding three pieces of the four-fold thicker thread to form a twelve-fold thicker thread.

3. The surface skin according to claim 2, wherein the second thread is tightly braided.

4. The surface skin according to claim 2, wherein the second thread is loosely braided.

5. The surface skin according to claim 1, wherein the second thread is a thread which is formed by twisting two pieces of fiber to form a twofold thicker thread, followed by warp braiding four pieces of the twofold thicker thread.

6. A molded product comprising:
the surface skin according to claim 1; and
a foamed body integrally foam-molded with the surface skin and covered by the surface skin.

7. A vehicle seat comprising:
the molded product according to claim 6;
a seat cushion; and
a seat back,
wherein the molded product is a head rest.

* * * * *